United States Patent [19]

Negron-Crespo

[11] Patent Number: 4,691,684

[45] Date of Patent: Sep. 8, 1987

[54] APPARATUS FOR MODIFYING BUILDING BLOCKS

[76] Inventor: Jorge L. Negron-Crespo, 809 Managua St., San Juan, P.R. 00921

[21] Appl. No.: 818,041

[22] Filed: Jan. 13, 1986

[51] Int. Cl.[4] .............................................. B28D 1/18
[52] U.S. Cl. .......................................... 125/3; 29/563; 408/44; 51/80 A
[58] Field of Search .................... 29/563, 564; 408/44; 125/3, 13 R; 51/80 A

[56] References Cited

U.S. PATENT DOCUMENTS

| | | | |
|---|---|---|---|
| 790,823 | 9/1905 | Garfield | 408/42 |
| 1,863,839 | 6/1932 | Duff | 408/44 |
| 2,187,299 | 1/1940 | Burkhardt | 125/13 R |
| 3,213,510 | 10/1965 | Mizer | 51/81 |
| 3,298,097 | 1/1967 | Gilbert | 29/564 |
| 3,918,210 | 11/1975 | Mori | 125/3 |
| 3,918,825 | 11/1975 | Alberti | 29/563 |
| 4,256,078 | 3/1981 | Whitty | 125/3 |

*Primary Examiner*—Harold D. Whitehead
*Attorney, Agent, or Firm*—Dressler, Goldsmith, Shore, Sutker & Milnamow, Ltd.

[57] ABSTRACT

Apparatus for modifying building blocks which vary somewhat in size to provide spaced-apart depressions in the top and bottom surfaces thereof with the bottoms of the depression in the bottom surface being at a uniform distance from the top surface of the blocks comprises groove cutting and associated block drilling means. The drilling includes movable plates carrying a plurality of drills, means to move one of the plates before the other, and means to position the blocks for proper drilling. Also, a plurality of cutters are used to speed the cutting operation.

8 Claims, 7 Drawing Figures

APPARATUS FOR MODIFYING BUILDING BLOCKS

DESCRIPTION

1. Technical Field

This invention relates to apparatus for modifying building blocks, and more particularly for drilling, and preferably also grooving, building blocks of the type disclosed in my prior application Ser. No. 492,132 filed May 6, 1983, now U.S. Pat. No. 4,514,949.

2. Background Art

Until recently, building blocks have not been drilled in a manner which allows them to be used in the accurate construction of walls. This is true even after it was appreciated that metal balls could be used to hold building blocks together in a wall, there was no acceptable means of insuring the straightness of the block with respect to one another in the wall. In my said prior patent, I found that if the ball-receiving depressions in the building blocks were formed so that the bottoms of the depressions in the top of the blocks were at a uniform elevation with respect to the bottom of the blocks, that the blocks so-drilled could be used to form a wall in which the blocks were level. Moreover, and by having a longitudinal V-shaped groove in the top of the blocks, I could force a rod into the groove, and thus align a row of blocks to insure the straightness of the wall. This application describes an apparatus for rapidly and accurately modifying conventional building blocks to be of the type described in my patent.

DISCLOSURE OF INVENTION

In accordance with this invention, an apparatus is provided for modifying conventional building blocks which vary somewhat in size to provide accurately spaced-apart depressions in the top and bottom surfaces thereof, the bottoms of the depression in the bottom surface being at a uniform distance from the top surface of the blocks. This apparatus comprises, roller means for supporting the blocks as they are moved through the apparatus, the blocks being supported on one side so that the top and bottom surfaces of the blocks are vertical as the blocks are moved through the apparatus. Means are provided to advance the blocks while on the rollers, the blocks being supported on one side thereof so that its top and bottom surfaces are vertically positioned as the blocks are moved through the apparatus. Means are provided to advance the blocks through the apparatus while they are on the rollers. Oppositely juxtaposed drill-carrying vertically disposed plates are employed, these being movable toward and away from one another at opposite sides of the roller means. Laterally spaced apart oppositely directed drills are fixedly mounted on these plates, the drills carrying horizontal drill bits for drilling depressions in the top and bottom surfaces of the blocks. Stop means are used to stop the advancing blocks when they are properly positioned with respect to the drills, and means, preferably roller means, are used to horizontally fix the top of said block between the plates. Means are employed to move the plates toward one another so that the drill bits will drill depressions in the tops and bottoms of the blocks. These same means function to move the plates apart after the depressions have been drilled. Then means are provided to remove the drilled block from the apparatus.

It is desired to point out that by having all the drills fixed to the movable plates, these drills will all move to a precise position when the plates are in their closed position, so that all the drill bits will be properly positioned when the plates are closed.

In preferred construction, the drill-carrying vertical plates are pivotally supported and means, such as piston means, are provided at the upper ends of the opposed plates for moving these plates toward and away from one another.

Roller means are used to laterally fix the block between the plates, and means are provided for moving the bottom-engaging plate against the bottom of the block before the other plate contacts the top of the block so that the depressions in the bottom will be started first. This is accomplished by spring means which bias the top-engaging plate toward its open position so that the bottom-engaging plate moves first.

Since the plates can only close to a limited extent, the drills carried by the bottom-engaging plate are positioned with respect to the top surface of the block instead of with respect to the final position assumed by the top-engaging plate.

It is also desired to cut a V-shaped groove, sometimes referred to as a V-groove, in the top surface of the blocks, and to do so rapidly to provide the capacity to provide properly modified blocks at an acceptable production rate. To do this, I provide roller means for supporting the blocks as they move, with the blocks being supported on one side thereof so that the top and bottom surfaces of the blocks are vertically positioned as the blocks are moved through the apparatus. A plurality of rotary cutting blades are mounted at one side of the roller means to cut the two faces of the desired V-shaped groove in the top surface of the blocks as they move past the rotary cutting blades.

The apparatus of this invention sequentially cuts and drills grooves and holes in a series of blocks while these blocks are advancing on a roller conveyor. This allows the blocks to be completely modified using only a single handling operation.

As one feature of the grooving operation, roller bearings are employed at the lower portion of the top face of the blocks to position these blocks as they move. At the same time, the blocks are propelled past the rotary cutting blades by means of a belt drive which bears against the corner between the upper side and the bottom surface of the blocks. In this way the blocks are moved and accurately positioned for cutting at the same time.

To provide adequate production speed, the rotary cutting blades are spaced apart along the length of the roller means with the upstream cutters cutting only a portion of the V-groove and the downstream cutters cutting the balance of the V-groove. This adds considerably to the rate of production. More particularly, the rotary cutters are arranged in pairs, an upstream pair cutting the opposite sides of the V-groove to about half the desired depth, and a downstream pair cutting the opposite sides of the V-groove to the balance of the desired depth.

Another feature is to be able to carry out a large nubmer of drilling operations in a single action by having these many drills mounted on opposed plates which move together and apart to allow the blocks to move between them and to be removed when drilling is complete.

Furthermore, the blocks being drilled are supported by resiliently mounted rollers until they are forced downwardly against supports to properly position them for accurate drilling. Moreover, the plates are moved together in such manner that one of them closes more rapidly than the other to laterally position the blocks as they are being drilled.

Other ancillary aspects of this invention, such as using a roller conveyor which includes a lead in portion and a portion extending between the sections of the apparatus which are inclined so that the blocks can move by their own weight, are conventional feature or features which place the apparatus in a preferred form, and will not therefore be discussed at great length.

Figure 1:
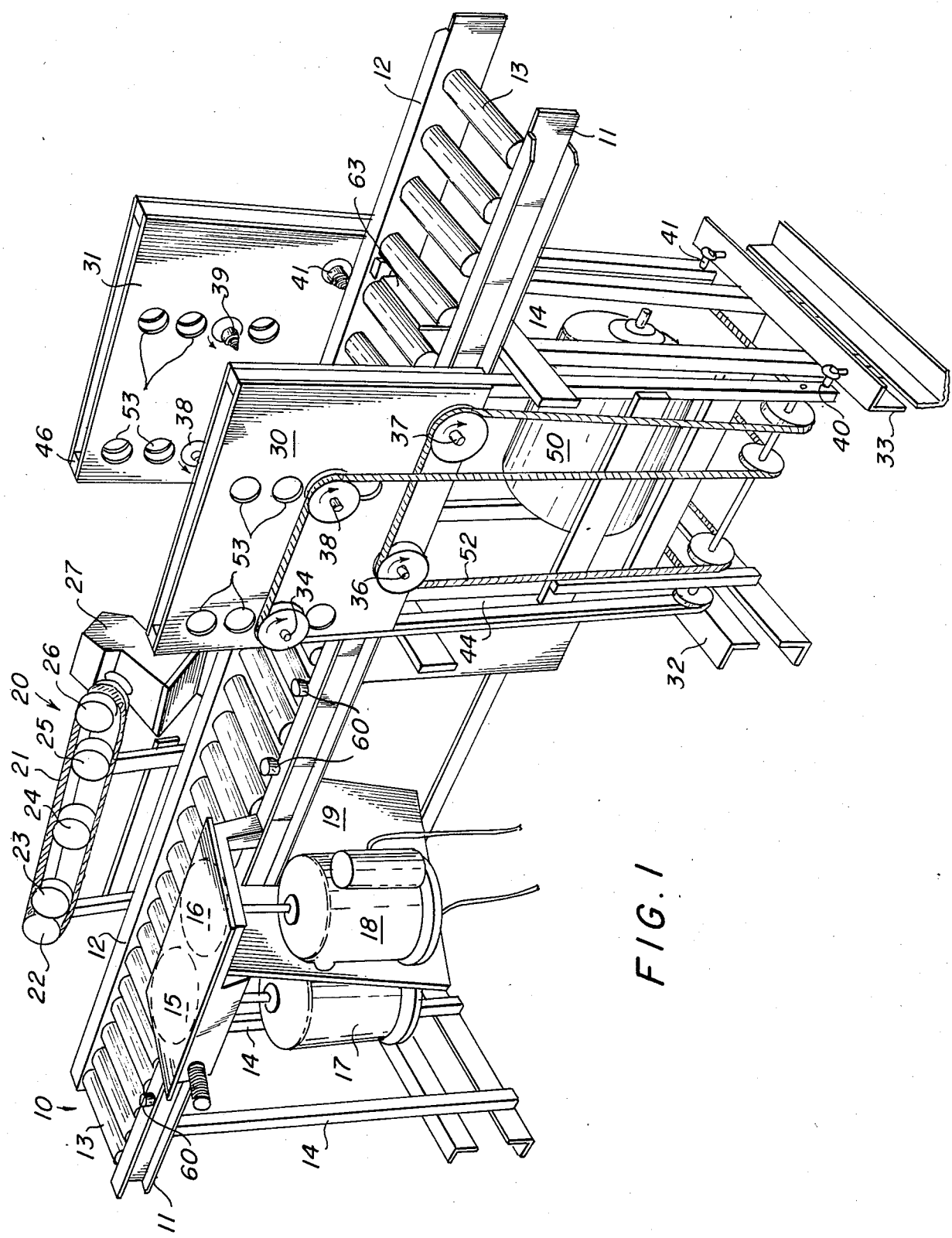
FIG. 1 is a perspective view of a simplified form of the apparatus of this invention.

Referring more particular to FIG. 1, the numeral 10 identifies a roller conveyor comprising side supports 11 and 12 with rollers 13 extending between these supports. The side support 11 and 12 are constituted by steel channel members which are supported by legs 14.

As previously indicated, the left hand portion of the roller conveyor 10 is inclined to facilitate reception of the blocks, but this merely facilitates handling and is not employed in this simplified form of the apparatus. The blocks are placed on the rollers 13 on their sides, the surface of the blocks which it is intended to use as the top surface facing the viewer.

As a matter of interest, the commercial formation of building blocks normally produces a block in which the bottom face of the molded block is smoother (more planar and uniform) than the opposite face. This bottom smoother molded surface becomes the top surface of the block in this invention.

The blocks in FIG. 1 are fed in from the left with their top surface facing the viewer, and it is this top surface which is grooved as the first stage of the operation.

The grooving operation in FIG. 1 is slow because it includes only one set of cutting discs 15 and 16 powered by motors 17 and 18 which are mounted on a plate 19 carried by the steel channel members 11 and 12. As will be evident, the cutting discs are positioned at an acute angle to one another so that each cuts one of the two faces of the groove which is desired in the upper face of the blocks.

The blocks are driven past the cutters 15 and 16 by means of a belt drive 20 which is carried, as shown, by the steel channel member 12. As can be seen, belt 21 is carried by roller 22, 23, 24, 25 and 26, the roller 26 being driven by motor 27 to power the belt 21.

After the blocks are grooved, they are advanced between plates 30 and 31 which are pivotally attached to supporting rails 32 and 33 (note pivots 40 and 41 are visible in FIG. 1). Drills 34, 35, 36 and 37 are fixed to the top-engaging plate 30 and drills 38, 39, 40 and 41 (only three of these are visible in FIG. 1) are fixed to the bottom-engaging plate 31. Plate 30 is supported by legs 44 and 45, and plate 31 is supported by legs 46 and 47.

The drills 34-41 are driven by pulleys powered by motor 50 via belts 51 and 52, the pulleys and belts for powering the drills associated with plate 31 being hidden from view and not shown, albeit the arrangement is the same as for the drills associated with plate 30.

As a matter of interest, holes 53 are provided in the plates 30 and 31, and the drills are mounted in appropriate holes depending upon the width of the blocks being drilled.

Figure 2:
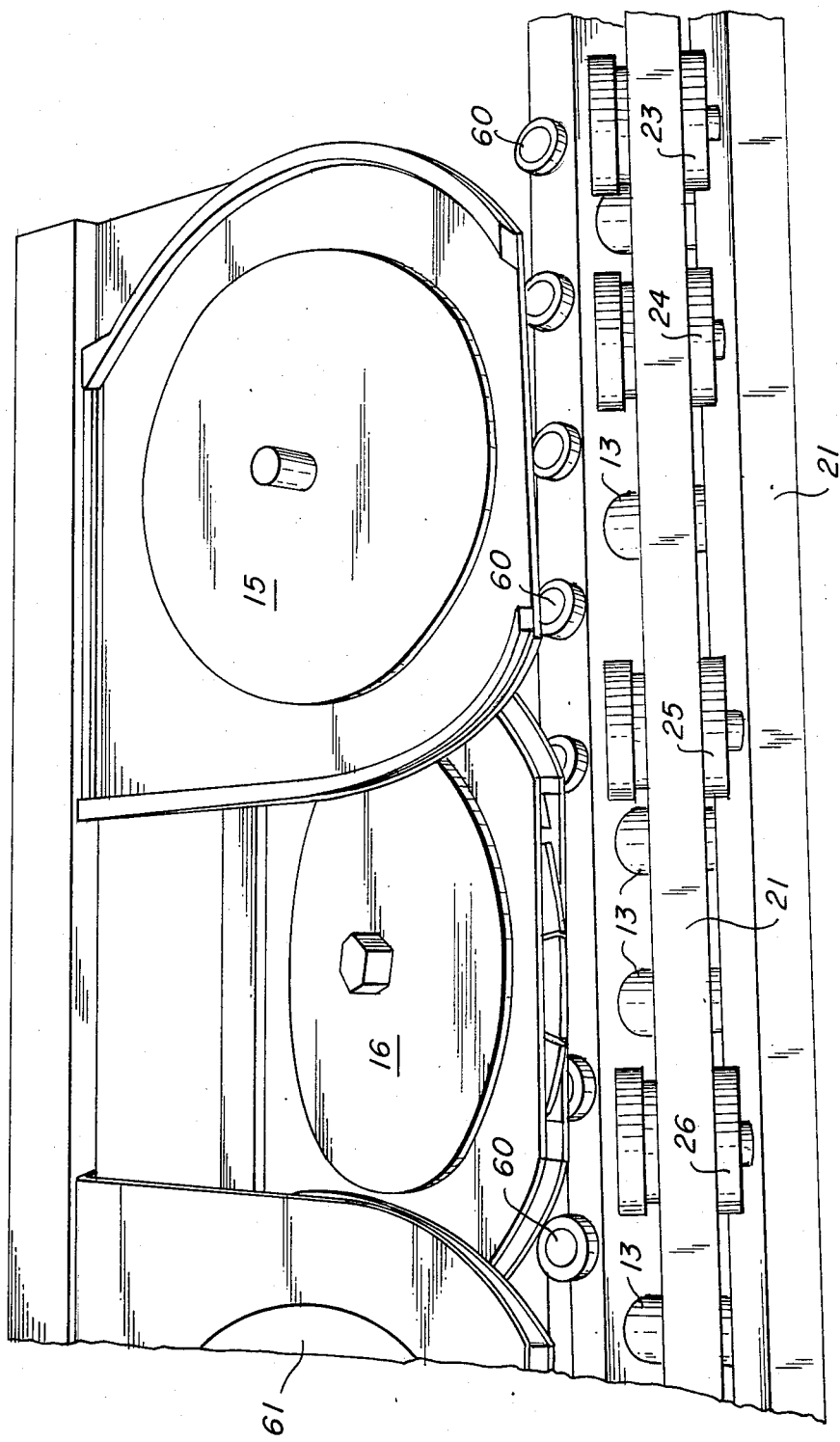
FIG. 2 is a partial perspective view showing the manner in which the blocks are held against the cutters so that the V-shaped groove can be cut into the upper surface of the blocks.

As can be seen in FIG. 2, drive belt 21 pushes the blocks downwardly and toward the cutters 15 and 16, forcing them to bear against the roller bearings 60 which are mounted on the top of support member 11.

Figure 3:
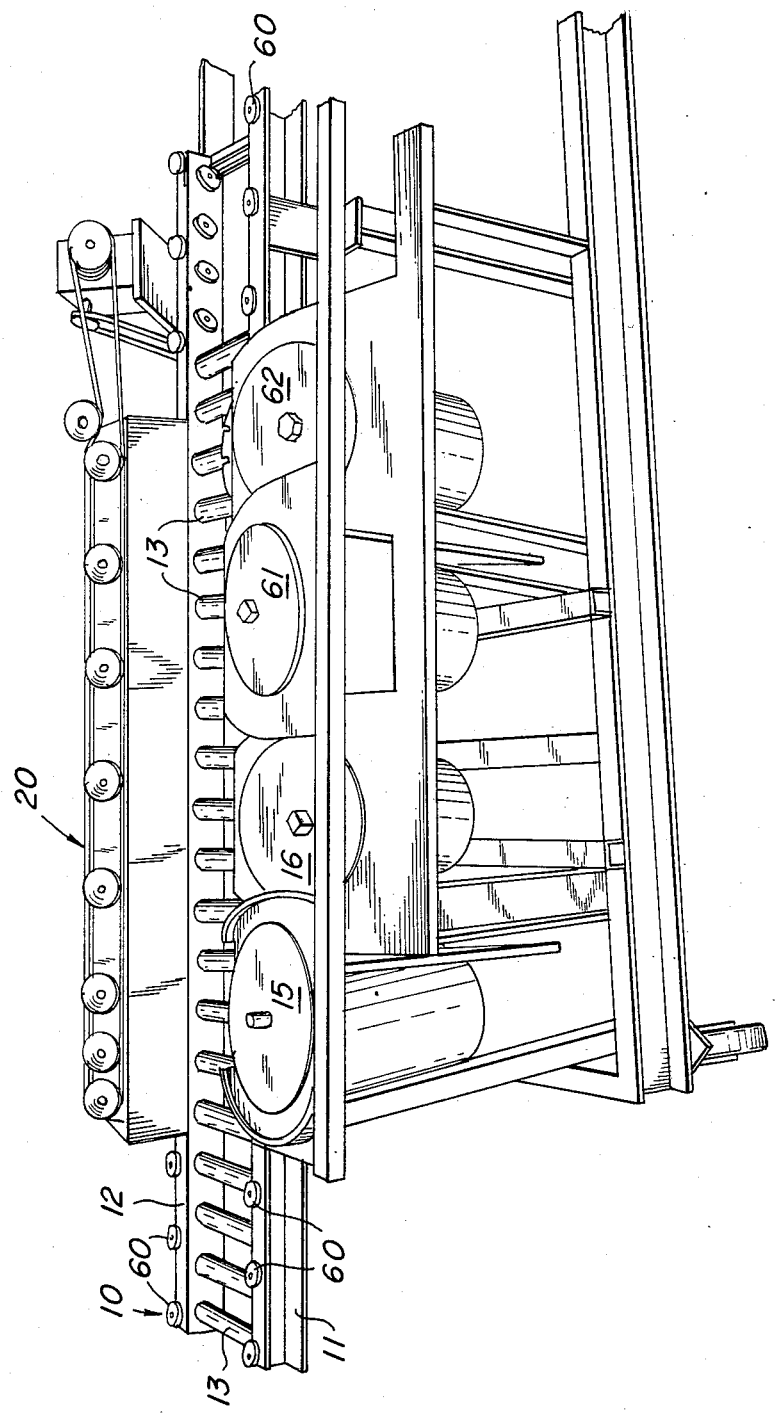
FIG. 3 is a partial perspective view showing the use of a plurality of pairs of cutters to speed operation.

The preferred cutting arrangement is shown in a preferred construction in FIG. 3 in which it can be seen that the cutters 15 and 16 are positioned upstream, and these cut only a portion of the groove, the balance of the groove being cut by the downstream cutters 61 and 62. While two sets of cutters have been shown, it will be evident that one can use more sets of cutters in order to reduce the extent of cutting accomplished by any cutting blade, and this speeds the cutting operation to increase the speed of production.

Figure 4:
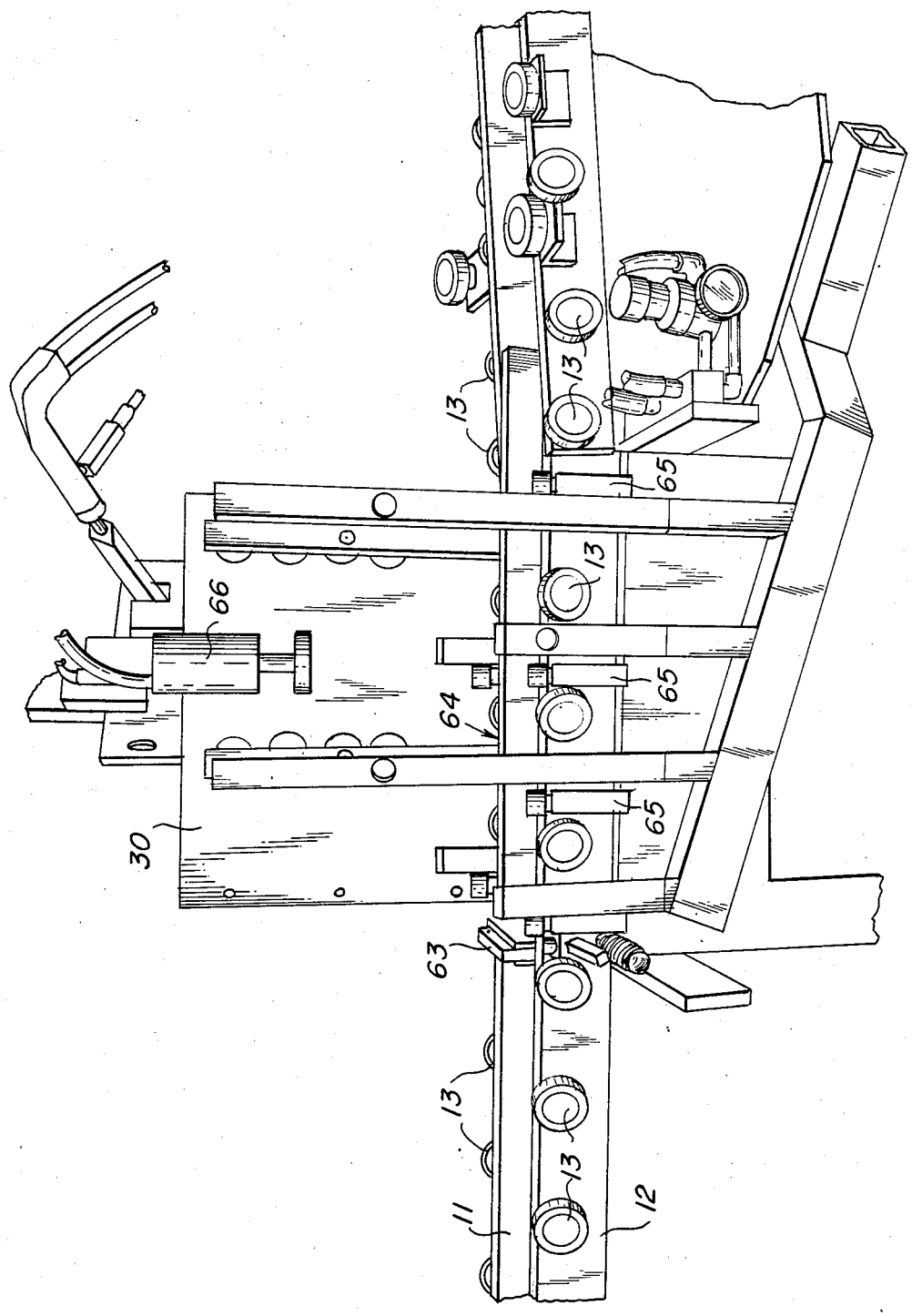
FIG. 4 is a partial elevation taken from the space between the drilling plates showing the structure associated with one on these plates.
Figure 5:
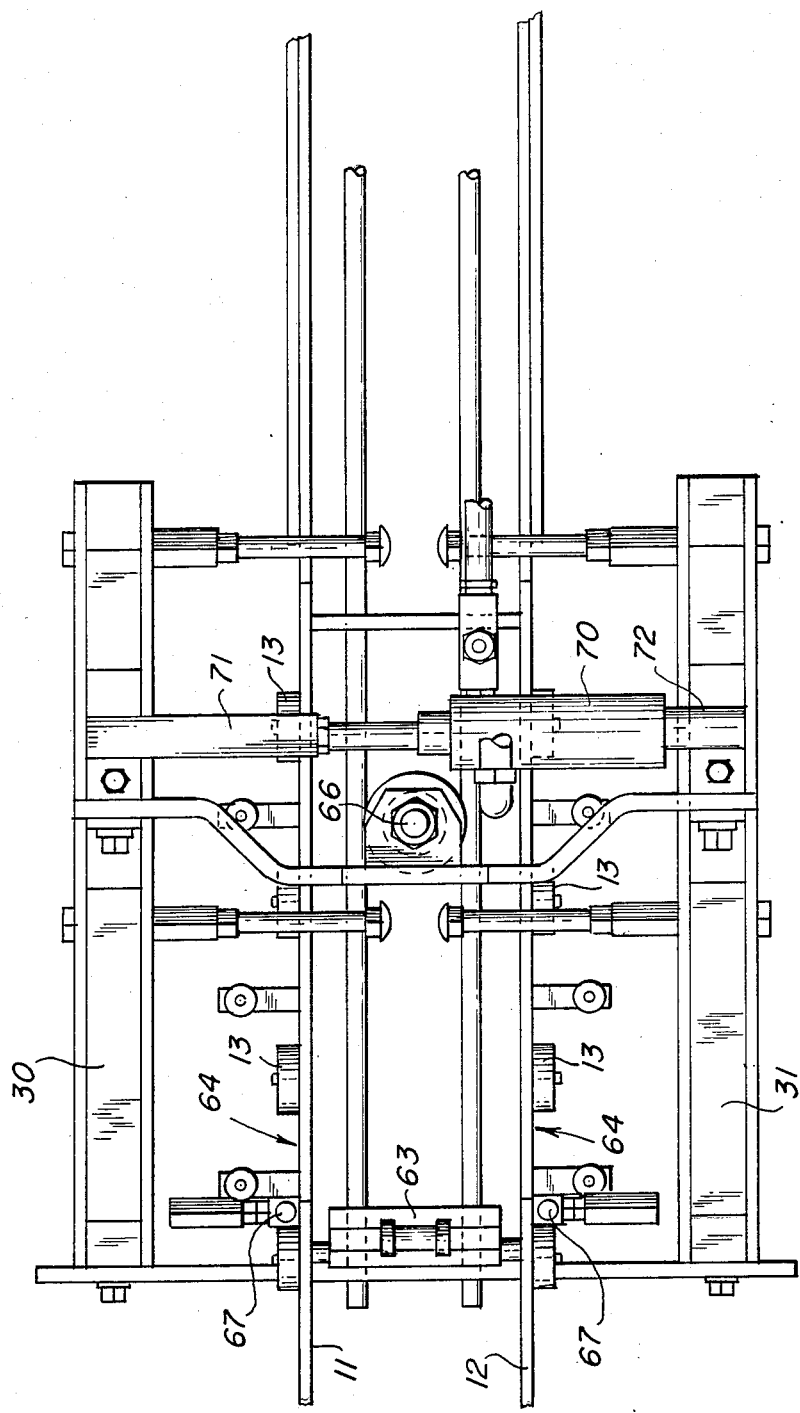
FIG. 5 is a top plan view of the downstream portion of the drilling section showing the mechanism for supporting the blocks as they are drilled and the pistons which hold the blocks down and which open and close the drilling plates.

After the groove cutting operation is complete, the blocks are pushed through the space between the plates 30 and 31 until they reach a stop 63 which longitudinally positions the block which is to be drilled. This positions the block to be drilled atop a separate section of rollers 64 which are resiliently mounted by means of springs positioned within tubular housing 65 and which function to elevate the roller section 64. As shown in FIGS. 4 and 5, roller section 64 is formed in two identical halves, the half associated with plate 30 being shown in FIG. 4. When a block is in proper position against the stop 63, an overhead double-acting piston 66 is powered with air to force the block downwardly, thereby overpowering the springs in housings 65 until the block is supported by adjustable supports 67, two of which are shown in FIG. 5. There are four such supports, FIG. 5 showing the two which are downstream. These supports 67 hold the block in a precise position while it is being drilled.

Figure 6:
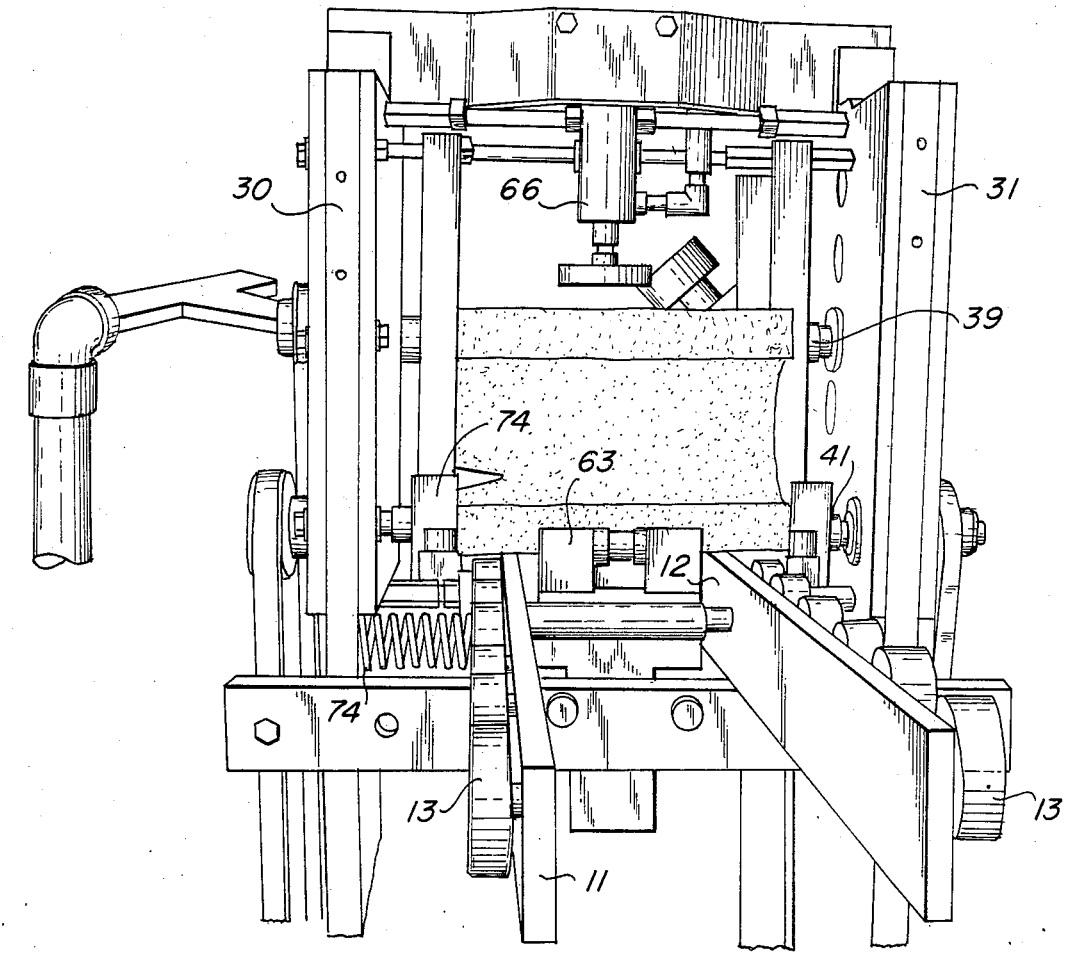
FIG. 6 is a view of the drilling section of the apparatus taken from the exit of the section.

The plates are moved together by means of double-acting piston 70 which is connected by means of arms 71 and 72 to the upper ends of plates 30 and 31 as shown in FIG. 5. When air is forced into one end of piston 70 it closes the plates, and when it is forced into the other end of piston 70, it opens the plates. It will be observed in FIG. 6 that plate 30 is biased into its open position by means of springs 73 which serve to retard the closing action of plate 30. This allows the inward motion of plate 31 and the drill bits carried thereby to push the blocks laterally against stops 74. In FIG. 6, only the downstream spring 73 and the downstream stop 74 re observable, but it will be manifest that there are corresponding upstream structures.

It will be understood that the piston 66 is operated substantially at the same time as piston 70 so that the block is moved downwardly against supports 67 at the same time that it is moved toward plate 30 and against stop 74.

The discussion has been directed to an apparatus which drills a single block at a time, but it will be evident that one can employ larger plates with more drills so that several blocks can be positioned between these plates to be drilled at the same time by a single plate closing operation.

As will now be evident, the piston 70 closes plates 30 and 31 which causes the top and bottom surfaces of the block to be drilled, and when the drilling is complete, the piston 70 opens plates 30 and 31 so that the complete grooved and drilled block can be ejected from the apparatus.

It will now be seen that the apparatus of this invention sequentially cuts and drills grooves and holes in a series of blocks while these blocks are advancing on a roller conveyor. This allows the blocks to be completely modified for use in building walls with only a single handling operation.

Moreover, the blocks are held while moving with great accuracy for proper grooving using a belt drive to force the upper corner of the blocks remote from the cutters downwardly and inwardly against roller stops to maintain a correct positioning of the blocks as they are grooved.

Also, these cutters are shown to be useful in a plurality of pairs each of which accomplish only a portion of the desired cutting operation so that the blocks can be moved more rapidly to speed production.

It will also be seen that the apparatus allows a large number of drilling operations to be performed in a single action by having these many drills mounted on opposed plates which move together and apart to allow the blocks to move between them and to be removed when drilling is complete.

Furthermore, the blocks being drilled are supported by resiliently mounted rollers until they are forced downwardly against supports to properly position them for accurate drilling.

Moreover, the plates are moved together in such manner that one of them closes more rapidly than the other to laterally position the blocks as they are being drilled.

The motion of the blocks moving down the roller conveyor 10 will now be more fully discussed.

Figure 7:
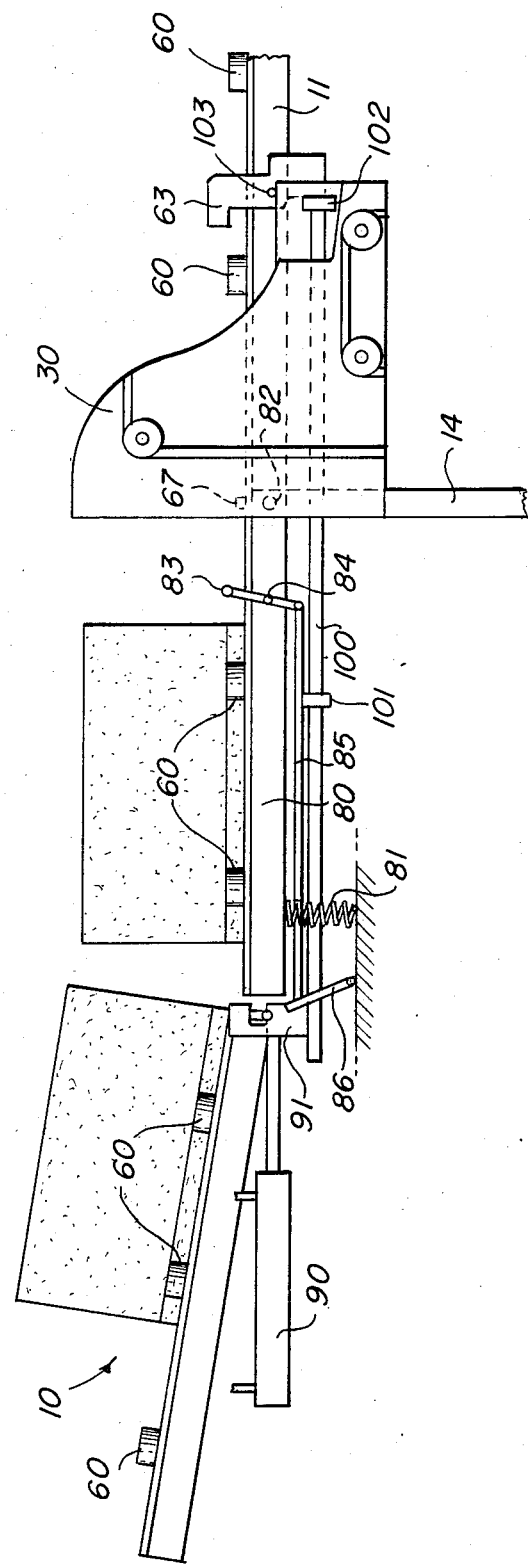
FIG. 7 is a diagramatic partial side elevation showing the manner in which the blocks are pushed through the apparatus.

As can be seen in FIG. 7, the roller conveyor 10 includes an intermediate section 80, the upstream portion of which is maintained by compression spring 81 in an elevated position which aligns section 80 with the downwardly sloping upstream section of conveyor 10 which exits the cutting section of the apparatus. The downstream portion of section 80 is pivoted at 82 to a supporting leg 14 which is positioned at the entrance end of the drilling section. The upper end of this leg 14 immediately above pivot 82 carries one of the upstream stops 67 which support the blocks when these are depressed by piston 66.

The blocks passing through the cutting section finally rest upon the section 80 and reach an actuator 83 which is pivotally mounted on section 80 at 84 to manipulate rod 85 which pivots a pivotal support 86 which normally holds the upstream end of section 80 in place. When the upstream end of section 80 is released by the action of elements 83-86, the weight of the block on section 80 overcomes the pressure of spring 81 to lower the upstream end of section 80.

When the upstream end of section 80 is depressed, it lowers the upstream end of the block to allow piston 90 which carries a pushing element 91 to engage the rear bottom corner of the block.

As piston 90 pushes the block forwardly into the drilling area behind plate 30, it forces it against stop 63 which will be discussed shortly. As soon as the block being pushed moves beyond a certain point, the upward pressure of spring 81 elevates the upstream section 80, and when the block moves beyond actuator 83, the pivotal support 86 returns to its supporting position. The pushing element 91 includes a pivotally mounted upper end 91 which is locked when the piston is pushing but which pivots out of the way on the return stroke to avoid the forward end of the trailing block.

Pushing element 91 rides on rods 100 to which are fixed collars 101. When pushing element 91 engages collars 101, the rods 100 are forced downstream. The downstream ends of rods 100 carry a pushing plate 102 which bears against the lower heavy portion 103 of the stop 63 which is pivoted to channel member 11 at 103. As a result, stop 63 is normally free to allow the blocks to move past it. But when pushing element 91 is in its downstream position, it engages the lower portion 103 of stop 63 and the advancing block engages the upper portion of stop 63 and this forces the blocks into a proper longitudinal position. This action automatically accomodates minor variations in the length of the blocks being modified.

The operation of the apparatus is straightforward. Blocks placed on the roller conveyor 11 are pulled past the cutters by the belt drive 20. When the grooved blocks move downstream, they engage actuator 83 which releases section 80 which is depressed by the weight of the block overcoming spring 81. This exposes the lower trailing corner of the block which is engaged by pushing element 91 which forces the block downstream into the space between drilling plates 30 and 31. The pushing element also engages the lower portion of a pivotal stop 63 to accurately position the block longitudinally between the plates. The pushing element is then retracted and the positioned block is drilled. When drilling is complete, pushing element 91 is advanced again to engage the next block and when it advances, it pushes the previously drilled block out from between the plates 30 and 31 which are opened for this purpose at the end of the drilling cycle.

What is claimed is:

1. Apparatus for modifying building blocks which vary somewhat in size to provide spaced-apart depressions in the top and bottom surfaces thereof with the bottoms of the depression in the bottom surface being at a uniform distance from the top surface of the blocks comprising:
   A. roller means for supporting the blocks as they are moved, the blocks being supported on one side thereof so that the top and bottom surfaces of the blocks are vertically positioned as said blocks are moved through the apparatus;
   B. means to advance said blocks through the apparatus while on said rollers;
   C. oppositely juxtaposed drill-carrying vertically disposed plates movable toward and away from one another at opposite sides of said roller support means, said drill-carrying vertical plates being pivotally supported and means are provided at the upper ends of said plates for moving said plates toward and away from one another;

D. a plurality of laterally spaced apart oppositely directed drills fixedly mounted on said plates for movement therewith, said drills carrying horizontal drill bits for drilling depressions in the top and bottom surfaces of said blocks;

E. stop means for stopping the advancing blocks when they are properly positioned with respect to said drills;

F. means for horizontally fixing the top of said block between said plates;

G. means for moving said plates toward one another so that said drill bits will drill depressions in the tops and bottoms of said blocks;

H. means for moving said plates apart after said depressions have been drilled; and I. means to remove the drilled block from the apparatus after said plates have been moved apart.

2. Apparatus as recited in claim 1 in which said means for moving said plates toward and away from one another is constituted by a double-acting piston secured to the upper ends of said plates.

3. Apparatus as recited in claim 1 in which roller means are employed for horizontally fixing the top of said block between said plates, and means are provided for moving the bottom-engaging plate against the bottom of said block before the other plate contacts the top of said block so that the depressions in the bottom of the block will be drilled first.

4. Apparatus as recited in claim 3 in which spring means are provided to bias the top-engaging plate toward its open position whereby the bottom-engaging plate begins to drill first.

5. Apparatus for modifying building blocks which vary somewhat in size to provide spaced-apart depressions in the top and bottom surfaces thereof with the bottoms of the depression in the bottom surface being at a uniform distance from the top surface of the blocks and with the top surface of said blocks having a V-shaped groove therein comprising:

A. roller means for supporting the blocks as they move with the blocks being supported on one side thereof so that the top and bottom surfaces of the blocks are vertically positioned as said blocks are moved through the apparatus;

B. a plurality of rotary cutting blades mounted at one side of said roller means to cut the opposite sides of said V-shaped groove in the top surface of said blocks as said blocks move past said rotary cutting blades;

C. roller bearings positioned at the lower portion of the top face of the blocks to position these blocks as they move;

D. belt means positioned to bear against the corner between the upper side and the bottom surface of said blocks to propel said blocks past said rotary cutting blades; and E. means to drill the said blocks to provide said spaced-apart depressions in the top and bottom surfaces thereof.

6. Apparatus for modifying building blocks which vary somewhat in size to provide spaced-apart depressions in the top and bottom surfaces thereof with the bottoms of the depression in the bottom surface being at a uniform distance from the top surface of the blocks and with the top surface of said blocks having a V-shaped groove therein comprising:

A. roller means for supporting the blocks as they move with the blocks being supported on one side thereof so that the top and bottom surfaces of the blocks are vertically positioned as said blocks are moved through the apparatus;

B. a plurality of rotary cutting blades mounted at one side of said roller means to cut the opposite faces of said V-shaped groove in the top surface of said blocks as said blocks move past said rotary cutting blades; and C. said rotary cutting blades being spaced apart along the length of said roller means with the upstream cutters cutting only a portion of the V-groove and the downstream cutters cutting the balance of the V-groove whereby said V-groove can be cut into said blocks rapidly; and D. means to drill the said blocks to provide said spaced-apart depressions in the top and bottom surfaces thereof.

7. Apparatus as recited in claim 6 in which said rotary cutters are arranged in pairs, an upstream pair cutting the opposite faces of said V-groove to about half the desired depth, and a downstream pair cutting the opposite sides of said V-groove to the balance of the desired depth.

8. Apparatus for modifying building blocks which vary somewhat in size to provide spaced-apart depressions in the top and bottom surfaces thereof with the bottoms of the depression in the bottom surface being at a uniform distance from the top surface of the blocks and with the top surface of said blocks having a V-shaped groove therein comprising:

A. roller means for supporting the blocks as they move with the blocks being supported on one side thereof so that the top and bottom surfaces of the blocks are vertically positioned as said blocks are moved through the apparatus;

B. a plurality of rotary cutting blades mounted at one side of said roller means to cut the opposite sides of said V-shaped groove in the top surface of said blocks as said blocks move past said rotary cutting blades;

C. drilling means for forming said depressions positioned downstream of said cutting blades and comprising a plurality of drills carried by movably mounted opposed plates;

D. said roller means including a section intermediate said cutting blades and said drilling means, said section being pivotally mounted at its downstream end so that its upstream end can move from an elevated position in which it is a continuation of the roller path in the vicinity of said cutting blades to a lowered horizontal position; and E. piston means for engaging the lower trailing corner of a block leaving said cutting means to push said block from said section into said drilling means.

* * * * *